(12) United States Patent
Hern (10) Patent No.: US 10,704,797 B2
(45) Date of Patent: Jul. 7, 2020

(54) SENSOR MANAGEMENT SYSTEMS FOR HVAC SYSTEMS

(71) Applicant: Johnson Controls Technology Company, Auburn Hills, MI (US)

(72) Inventor: Shawn A. Hern, Derby, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 149 days.

(21) Appl. No.: 15/914,732

(22) Filed: Mar. 7, 2018

(65) Prior Publication Data

US 2019/0271481 A1 Sep. 5, 2019

Related U.S. Application Data

(60) Provisional application No. 62/637,191, filed on Mar. 1, 2018.

(51) Int. Cl.
| | | |
|---|---|---|
| *F24F 11/32* | (2018.01) | |
| *F24F 11/49* | (2018.01) | |
| *F24F 11/70* | (2018.01) | |
| *F24F 140/20* | (2018.01) | |
| *F24F 140/12* | (2018.01) | |

(52) U.S. Cl.
CPC .............. *F24F 11/32* (2018.01); *F24F 11/49* (2018.01); *F24F 11/70* (2018.01); *F24F 2140/12* (2018.01); *F24F 2140/20* (2018.01)

(58) Field of Classification Search
None
See application file for complete search history.

(56) References Cited

U.S. PATENT DOCUMENTS

| | | |
|---|---|---|
| 4,848,096 A | 7/1989 | Funahashi et al. |
| 7,473,868 B2 | 1/2009 | Bohan, Jr. et al. |
| 7,490,477 B2 | 2/2009 | Singh et al. |
| 7,594,407 B2 | 9/2009 | Singh et al. |
| 7,665,315 B2 | 2/2010 | Singh et al. |
| 2016/0047584 A1 | 2/2016 | Bahel et al. |

*Primary Examiner* — Carlos R Ortiz Rodriguez
(74) *Attorney, Agent, or Firm* — Fletcher Yoder, P.C.

(57) ABSTRACT

A controller for a heating, ventilation, and air conditioning (HVAC) system is configured to receive a first feedback from a first sensor of the HVAC system and receive a second feedback from a second sensor of the HVAC system. The controller is configured to determine a saturated parameter corresponding to a working fluid based on the second feedback. Additionally, the controller is configured to transmit an indication in response to determining that the saturated parameter has a threshold correlation to the first feedback.

30 Claims, 9 Drawing Sheets

SENSOR MANAGEMENT SYSTEMS FOR HVAC SYSTEMS

CROSS REFERENCE TO RELATED APPLICATIONS

This application claims priority from and the benefit of U.S. Provisional Application Ser. No. 62/637,191, entitled "SENSOR MANAGEMENT SYSTEMS FOR HVAC SYSTEMS," filed Mar. 1, 2018, which is hereby incorporated by reference in its entirety for all purposes.

BACKGROUND

The present disclosure relates generally to heating, ventilation, and air conditioning (HVAC) systems, and more particularly, to sensor management systems for controlling and verifying sensors of the HVAC systems.

Residential, light commercial, commercial, and industrial systems are used to control temperatures and air quality in buildings. To condition a building, an HVAC system may circulate a refrigerant through a closed circuit between an evaporator where the refrigerant absorbs heat and a condenser where the refrigerant releases heat. The refrigerant flowing within the closed circuit is generally formulated to undergo phase changes within the normal operating temperatures and pressures of the HVAC system so that quantities of heat can be exchanged by virtue of the latent heat of vaporization of the refrigerant to provide conditioned air to the buildings.

In general, an HVAC system may include various sensors that provide feedback indicative of various parameters of the HVAC system to a controller. For example, the sensors may measure temperatures, pressures, and flow rates of the refrigerant, ambient air, the conditioned air, and so forth. Based on the feedback, the controller operates various components of the HVAC system to condition an interior space of a building. However, in certain instances, a sensor of the HVAC system may incur wear or otherwise transmit erroneous data to the controller. As such, the controller may reduce an operational efficiency of the HVAC system by adjusting components based on the erroneous data. Moreover, in some instances, a technician may manually inspect each sensor of the HVAC system, thus delaying operation and increasing costs of the HVAC system.

SUMMARY

In one embodiment of the present disclosure, a sensor management system for a heating, ventilation, and air conditioning (HVAC) system includes a first sensor configured to provide feedback indicative of a temperature of a working fluid of the HVAC system and a second sensor configured to provide feedback indicative of a pressure of the working fluid. The sensor management system also includes a controller communicatively coupled to the first sensor and the second sensor. The controller is configured to receive the feedback indicative of the pressure from the second sensor and convert the feedback indicative of the pressure into a value indicative of a saturated temperature associated with the working fluid. Additionally, the controller is configured to transmit an indication in response to determining that the value indicative of the saturated temperature has a threshold correlation to the feedback indicative of the temperature received from the first sensor.

In another embodiment of the present disclosure, a controller for a heating, ventilation, and air conditioning (HVAC) system is configured to receive a first feedback from a first sensor of the HVAC system and receive a second feedback from a second sensor of the HVAC system. The controller is configured to determine a saturated parameter corresponding to a working fluid based on the second feedback. Additionally, the controller is configured to transmit an indication in response to determining that the saturated parameter has a threshold correlation to the first feedback.

In a further embodiment of the present disclosure, a tangible, non-transitory, computer-readable medium includes instructions executable by at least one processor of a sensor management system for a heating, ventilation, and air conditioning (HVAC) system that, when executed by the at least one processor, cause the at least one processor to receive feedback indicative of a pressure from a first sensor of the HVAC system. The instructions, when executed by the at least one processor, cause the at least one processor to receive feedback indicative of a temperature from a second sensor of the HVAC system and convert the feedback indicative of the temperature into a value indicative of a saturated pressure corresponding to a working fluid. The instructions, when executed by the at least one processor, also cause the at least one processor to transmit an indication in response to determining that the value indicative of the saturated pressure is outside a threshold range from the feedback indicative of the pressure.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to a sensor management system for monitoring a status of sensors for heating, ventilation, and air conditioning (HVAC) systems. During OFF-cycles of an HVAC system, in which the compressor is deactivated, refrigerant within the HVAC system forms a saturated two-phase fluid within refrigerant conduits and components. As such, each sensed temperature of the refrigerant may be converted to a saturated pressure and/or each sensed pressure of the refrigerant may be converted to a saturated temperature via a pressure-temperature relationship of a saturated fluid.

In recognition of this relationship, embodiments of the present disclosure are directed to a sensor management system that monitors and compares feedback or sensor signals from various sensors to each other to verify operation of the sensors based on saturation parameters. For example, the sensor management system may include a controller that detects when the HVAC system is in an OFF-cycle. The sensor management system may include a delay that suspends action by the sensor management system to enable the refrigerant in the HVAC system to equilibrate. After the refrigerant within the HVAC system has equilibrated with an ambient environment, each temperature sensor and each pressure sensor of the HVAC system may provide feedback to the controller, which converts some of the feedback into a saturated parameter. For example, as discussed herein, the sensor management system may convert any feedback indicative of pressure into corresponding saturated temperatures. Then, the refrigerant management system may compare feedback indicative of temperature and the saturated temperatures to one another to identify any outliers or otherwise verify operation of each sensor. Under some conditions, a sensor may provide feedback indicative of temperature or a saturated temperature that is outside of a tolerance or threshold range from the feedback of the other sensors, such that the sensor is identified as having an error and may be removed from control operations and/or operational decisions of the controller. As such, the sensor management system enables the HVAC system to quickly and efficiently determine the status of each sensor of the HVAC system, without reliance on technicians and/or detection devices that are external to the HVAC system.

Figure 1:
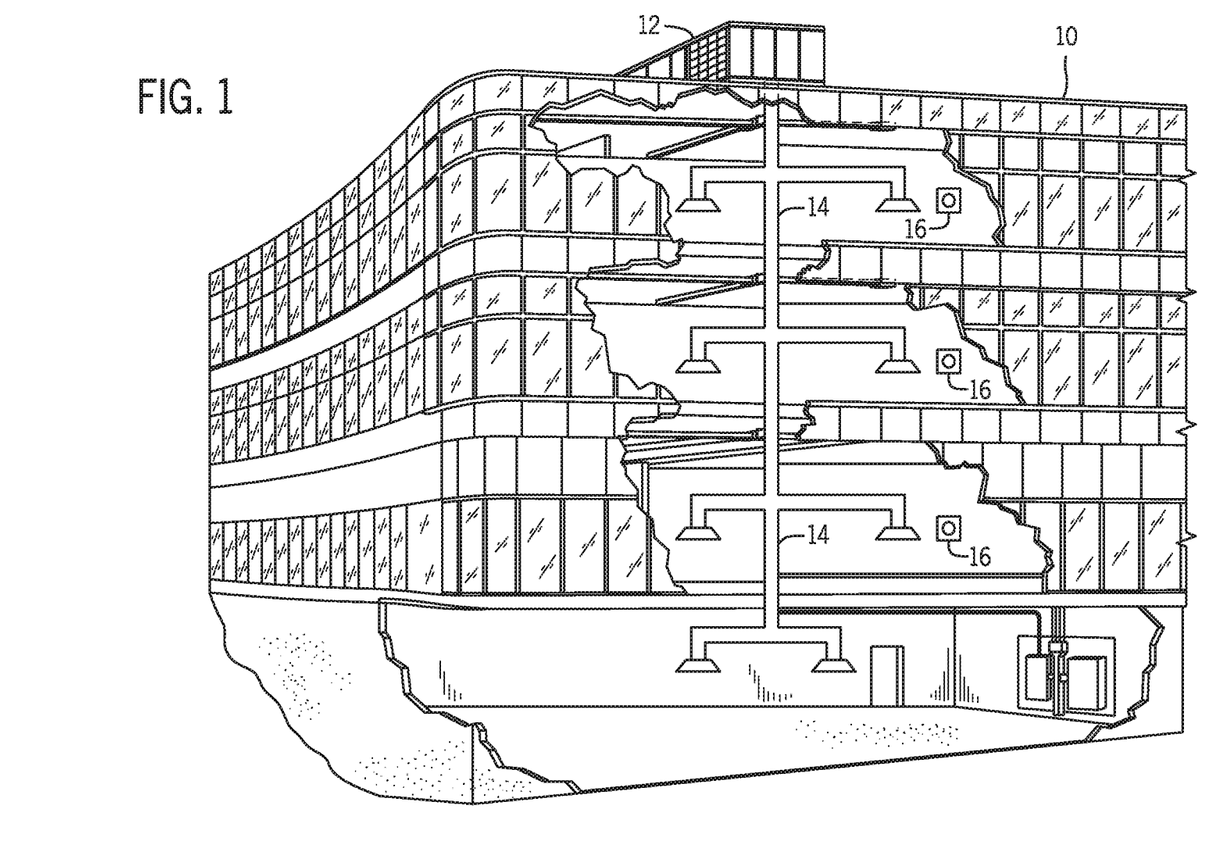
FIG. 1 is an illustration of an embodiment of a commercial or industrial HVAC system, in accordance with an aspect of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
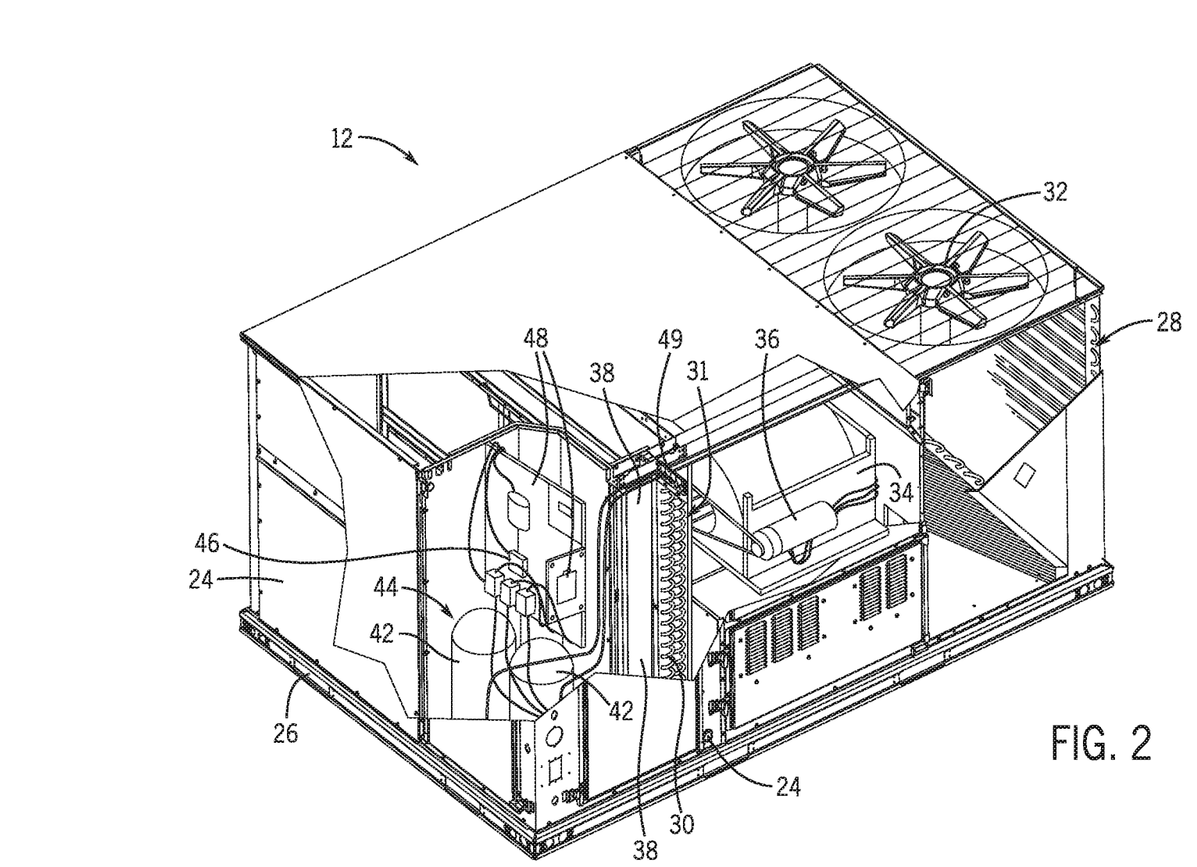
FIG. 2 is an illustration of an embodiment of a packaged unit of the HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
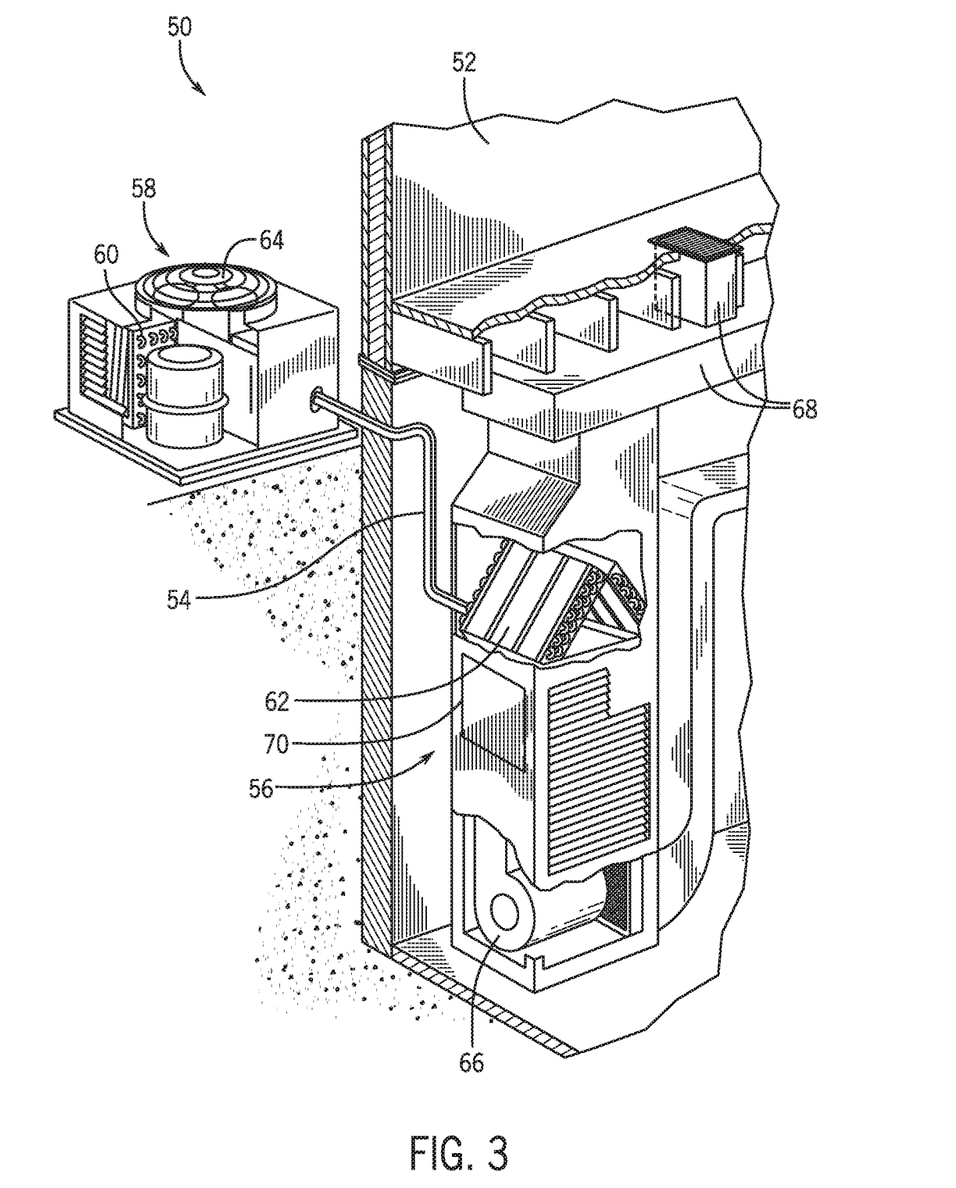
FIG. 3 is an illustration of an embodiment of a split system of the HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
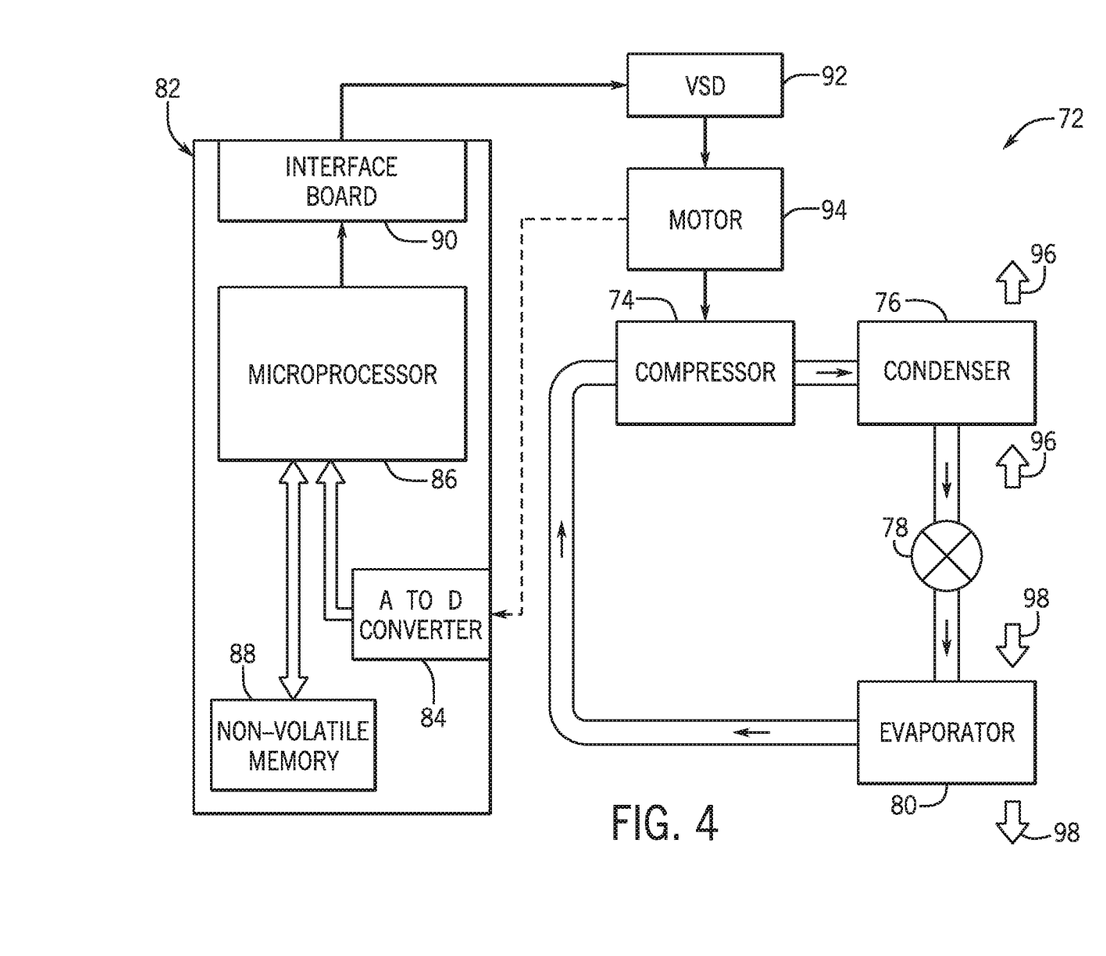
FIG. 4 is a schematic diagram of an embodiment of a refrigeration system of the HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
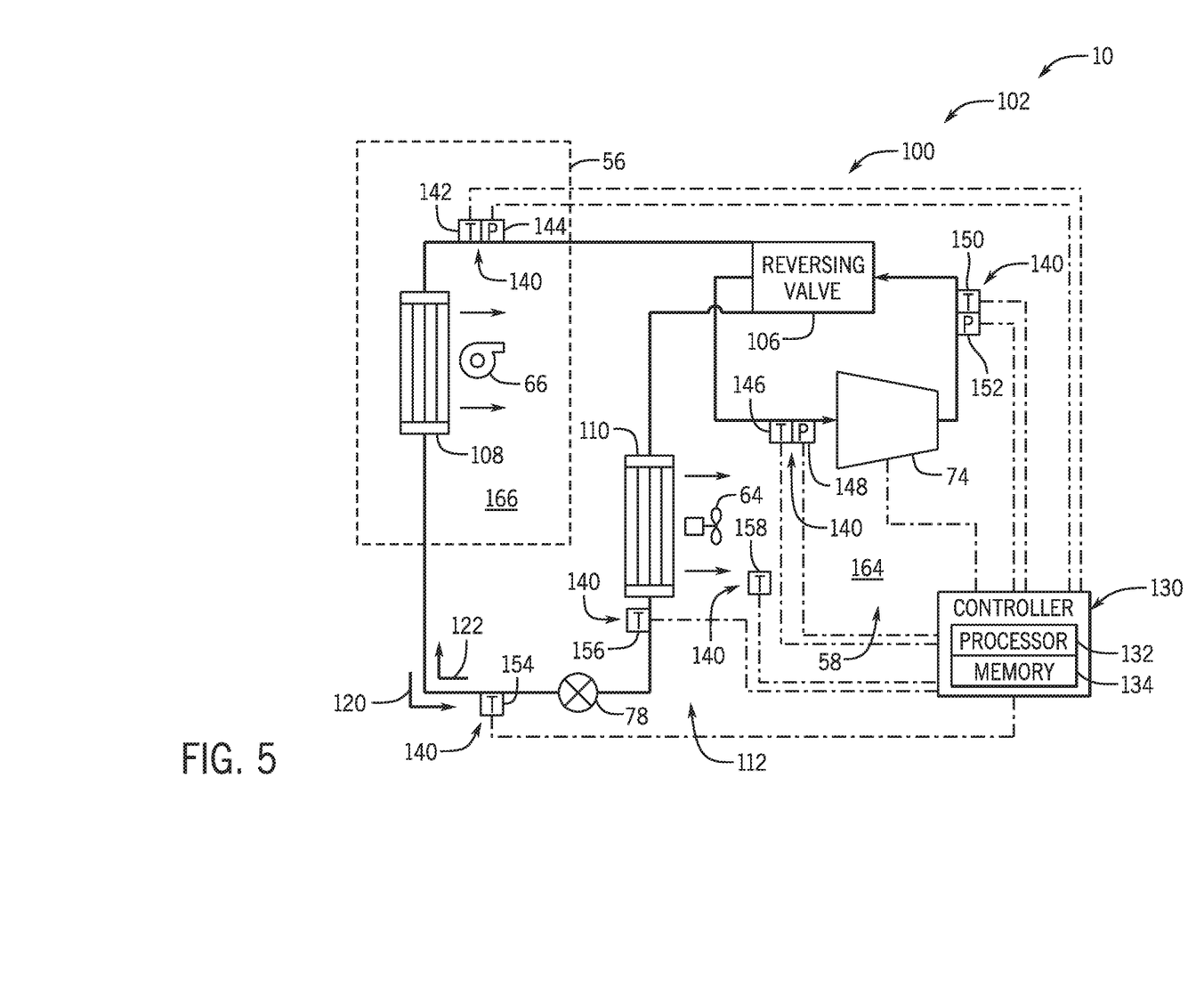
FIG. 5 is a schematic diagram of an embodiment of a sensor management system of the HVAC system, in accordance with an aspect of the present disclosure.

As set forth above, embodiments of the present disclosure are directed to a sensor management system that enables internal status monitoring of sensors of the HVAC unit 12, the residential heating and cooling system 50, and/or the vapor compression system 72, which are collectively referred to as an HVAC system 100. For instance, FIG. 5 is a schematic diagram of an embodiment of a sensor management system 102 for the HVAC system 100. In the illustrated embodiment, the HVAC system 100 is a heat pump system having a reversing valve 106. Thus, the HVAC system 100 may include the indoor HVAC unit 56 having the heat exchanger 62 discussed above, hereinafter an indoor heat exchanger 108, and the outdoor HVAC unit 58 having the heat exchanger 60 discussed above, hereinafter an outdoor heat exchanger 110. A compressor, such as the compressor 74 discussed above, may therefore be actuated to drive refrigerant through a refrigeration circuit 112 in a first direction 120 when the reversing valve 106 is in a first position. Similarly, the compressor 74 may be actuated to drive the refrigerant in a second direction 122, opposite of the first direction 120 when the reversing valve is in a second position.

Under conditions in which the refrigerant flows from the indoor heat exchanger 108 to the outdoor heat exchanger 110 in the first direction 120, the HVAC system 100 may activate the fan 64 to evaporate refrigerant within the outdoor heat exchanger 110 and activate the blower 66 to pass air over the indoor heat exchanger 108, which condenses the refrigerant. Thus, the air passing over the indoor heat exchanger 108 absorbs thermal energy from the refrigerant and is provided to an interior space of the building 10. When the refrigerant flows in the second direction 122 from the outdoor heat exchanger 110 to the indoor heat exchanger 108, the indoor heat exchanger 108 alternatively operates as an evaporator, thus enabling the HVAC system 100 to provide cooled air to the interior space of the building 10. Moreover, an expansion valve, such as the expansion device 78, is shown between the indoor heat exchanger 108 and the outdoor heat exchanger 110; however, in other embodiments, one expansion device may be provided for each flow direction of the refrigerant, such that two expansion devices are included between the indoor heat exchanger 108 and the outdoor heat exchanger 110. While the illustrated embodiment of FIG. 5 includes a heat pump as the HVAC system 100, in other embodiments, any other suitable HVAC system may be combined with the techniques disclosed herein.

Moreover, the sensor management system 102 includes a controller 130 having a processor 132 and a memory 134 to control and monitor various functions of the HVAC system 100. In some embodiments, the controller 130 corresponds to the control device 16, the control board 48, or the control panel 82 discussed above. The controller 130 may be included within the indoor HVAC unit 56, the outdoor HVAC unit 58, or any other suitable remote position. As illustrated, the controller 130 is communicatively coupled to various sensors 140 disposed within the indoor HVAC unit 56 and/or the outdoor HVAC unit 58 of the HVAC system 100. Moreover, the term "sensor" may include any suitable instrument capable of acquiring the feedback through direct or indirect observation indicators. For example, the controller 130 receives feedback from sensors 140 configured to monitor operating parameters of the HVAC system 100. With respect to the indoor HVAC unit 56, the illustrated sensors 140 include an indoor temperature sensor 142 and an indoor pressure sensor 144 configured to monitor an indoor refrigerant temperature and an indoor refrigerant pressure, respectively.

With respect to the outdoor HVAC unit 58, a first outdoor temperature sensor 146 and a first outdoor pressure sensor 148 are configured to monitor an outdoor refrigerant temperature and an outdoor refrigerant pressure upstream or at a suction end of the compressor 74, respectively. Further, a second outdoor temperature sensor 150 and a second outdoor pressure sensor 152 are configured to monitor an outdoor refrigerant temperature and an outdoor refrigerant pressure downstream or at a discharge end of the compressor 74, respectively. Additionally, a third outdoor temperature sensor 154 is disposed between the indoor heat exchanger 108 and the expansion device 78 with respect to the first direction 120 and a fourth outdoor temperature sensor 156 is disposed between the expansion device 78 and the outdoor heat exchanger 110 with respect to the first direction 120 to monitor respective outdoor refrigerant temperatures at the respective positions of the sensors 154, 156. A fifth outdoor temperature sensor 158 is included within the outdoor HVAC unit 58 to monitor an ambient air temperature of an outdoor environment 164 in which the outdoor HVAC unit 58 is disposed or within an enclosure of the outdoor HVAC unit 58.

It is to be understood that the sensors 140 included within the HVAC system 100 are exemplary and that any suitable combinations of sensors for any HVAC system 100 may be used by the sensor management system 102 in accordance with the techniques discussed herein. Moreover, the sensors 140 may each be different types of devices and may provide direct or indirect indications of pressure or temperature. For example, pressure sensors may include any suitable pressure measuring instrument, such as a pressure transducer, a pressure transmitter, a manometer, or the like, and temperature sensors may include any suitable temperature measuring instrument, such as a thermal sensor, a thermistor, a thermocouple, or the like.

In general, the sensor management system 102 verifies operation of the sensors 140 based on a comparison of feedback received from at least two of the sensors 140, as sampled during an OFF-cycle. For example, after compressor operation is ceased, the refrigerant moving within the refrigeration circuit 112 slows to a stop within conduits and/or components of the HVAC system 100. Thus, refrigerant that accumulates within the indoor HVAC unit 56 exchanges heat with an indoor environment 166 through the conduits and/or components, while refrigerant that accumulates within the outdoor HVAC unit 58 exchanges heat with the outdoor environment 164 through the conduits and/or components. Eventually, the refrigerant will no longer exchange heat with the indoor environment 166 or the outdoor environment 164, or reach an equilibrium state, in which the temperature and pressure of the refrigerant does not substantially change over time. As referred to herein, a change that is not substantial over time corresponds to a change of less than one percent of a value of a parameter of the refrigerant between subsequent measurements or feedback, such that the subsequent measurements are substantially equal to one another, though any other suitable threshold may be used by the present techniques.

In the present embodiment of the HVAC system 100, after reaching the equilibrium state, the refrigerant may be saturated. As such, saturated liquid, saturated vapor, or both are present within the refrigeration circuit 112. By utilizing saturated fluid properties or a pressure-temperature relationship of a saturated fluid, the embodied sensor management system 102 may correlate or convert feedback indicative of pressures into saturated temperatures and/or correlate feedback indicative of temperatures into saturated pressures. In some embodiments, the pressure-temperature relationship is stored in the memory 134 as an algorithm or as values within a database that enable the controller 130 to determine saturated fluid properties or parameters for any suitable combination of conditions of a working fluid, such as the refrigerant, in the HVAC system 100. It is to be understood that these values of the working fluid may be estimated values that are theoretically determined, actual values that are stored, or both. As used herein, the term "original feedback" refers to feedback received from the sensors 140 and the term "converted feedback" refers to feedback received from the sensors 140 and converted into a corresponding saturated parameter of a working fluid. Additionally, although referred to as temperatures, pressures, saturated temperatures, and/or saturated pressures herein, it is to be understood that the present techniques may also be performed with reference to values indicative of temperatures, values indicative of pressures, values indicative of saturated temperatures, and/or values indicative of saturated pressures, respectively. That is, the controller 130 may operate with reference to the original units that the feedback from the sensors 140 is provided in, such as volts. Then, by comparing the various original feedback and converted feedback of one type of parameter, such as temperature or pressure, to one another, the sensor management system 102 may monitor a status of each sensor 140 of the HVAC system 100. In some embodiments, the outdoor environment 164 and the indoor environment 166 may be maintained at different temperatures and/or pressures, and thus, the sensor management system 102 separately performs sensor management for the sensors 140 of the indoor HVAC unit 56 and the sensors 140 of the outdoor HVAC unit 58. More details related to various processes by which the sensor management system 102 may operate are described with reference to FIGS. 6-9 below.

Figure 6:
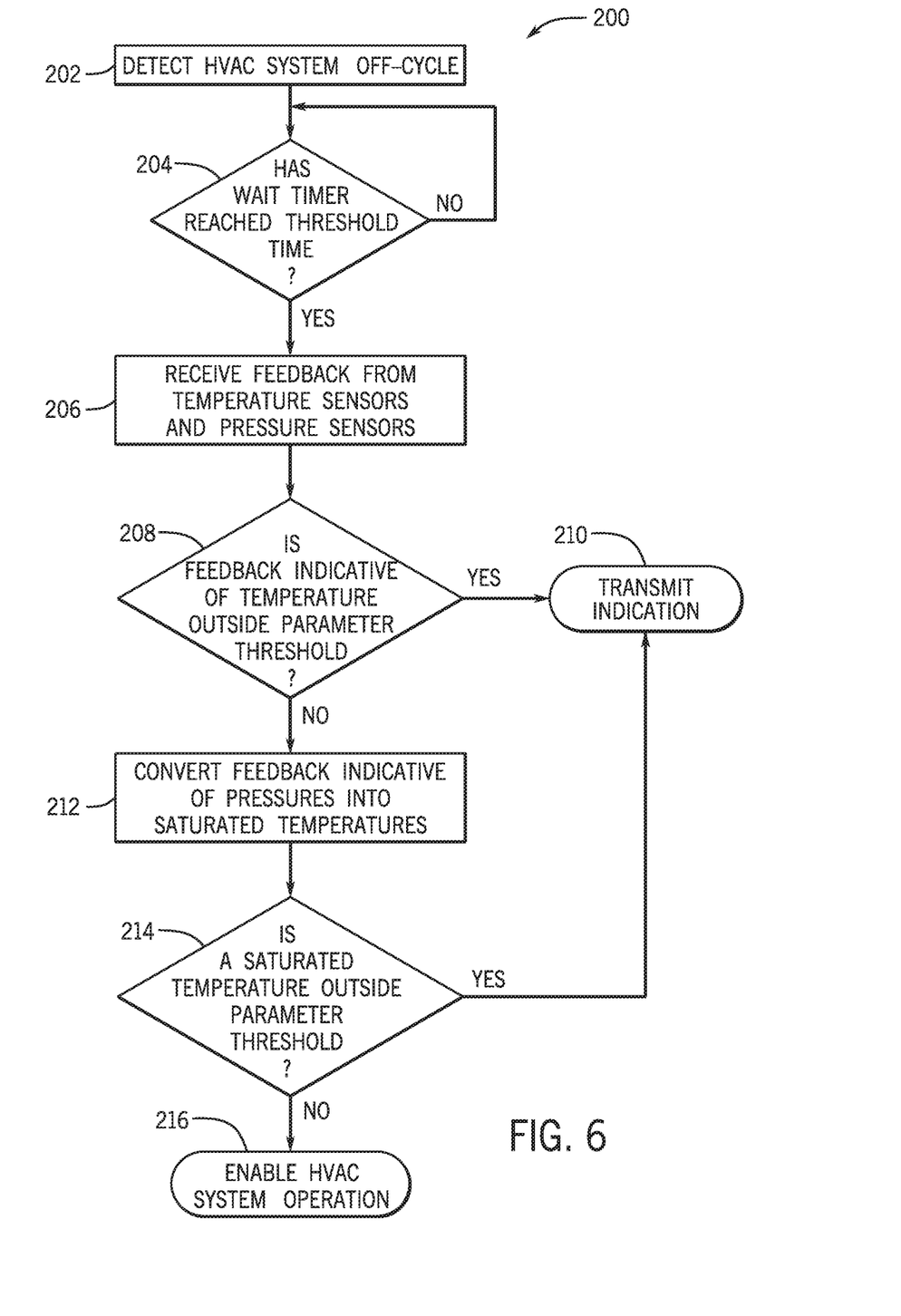
FIG. 6 is a flow diagram of an embodiment of a method for operating the sensor management system of FIG. 5, in accordance with an aspect of the present disclosure.

FIG. 6 is a flow diagram of an embodiment of a process 200 performed by the sensor management system 102 for monitoring a status of the sensors 140 of the HVAC system 100. It is to be understood that the steps discussed herein are merely exemplary, and certain steps may be omitted or performed in a different order than the order discussed herein. In some embodiments, the process 200 may be performed by the processor 132 of the controller 130, which may be a main HVAC controller of the HVAC system 100, or by a separate controller or processor that is communicatively coupled to the main HVAC controller. Additionally, although the process 200 is discussed with reference to the HVAC system 100 having the particular sensors 140 described above, the process 200 may be performed with any other suitable combination of sensors, including embodiments of the HVAC system 100 that have only one temperature sensor and one pressure sensor.

As indicated at block 202, the controller 130 performing the illustrated process 200 detects an OFF-cycle of the HVAC system 100. As discussed above, the OFF-cycle of the HVAC system 100 generally refers to conditions in which the compressor 74 is deactivated, such as when a heating or cooling call for conditioning the interior space of the building 10 is not received by, or determined by, the controller 130. As such, the refrigerant within the refrigeration circuit 112 may stop flowing and accumulate within the conduits and components of the HVAC system 100, thus enabling the refrigerant to approach a steady state condition. As indicated at block 204, the controller 130 determines whether a wait timer has reached a threshold time. The threshold time may be any suitable parameter stored within the memory 134 of the controller 130. For example, in the present embodiment, the threshold time is a manufacturer-set parameter indicative of an estimated or predetermined time after which the refrigerant within the HVAC system 100 reaches a steady state, or equilibrium, after detection of the OFF-cycle. In certain embodiments, the threshold time may be dynamically adjusted by the controller 130, a service technician, or user to enable the sensor management system 102 to adapt to conditions in which the ambient environments 164, 166 have a greater temperature differential with the refrigerant. For example, the controller 130 may use a longer threshold time during summer and winter seasons and use a shorter threshold time during spring and fall seasons. In some embodiments, the threshold time may be between 0 and 30 minutes, between 1 and 25 minutes, between 5 and 20 minutes, or between 12 and 17 minutes.

As indicated in block 204, in response to determining that the wait timer has not reached the threshold time, the controller 130 continues to wait and returns to block 204 until the wait timer has reached the threshold time. In this manner, the controller 130 blocks further determinations of the sensor management system 102 to reduce processing power until the refrigerant is estimated to have reached the steady state condition. In response to determining that the wait timer has reached the threshold time, as indicated in block 206, the controller 130 proceeds to receive feedback from the sensors 140 of the HVAC system 100. For example, the controller 130 may receive the feedback once a second, once a minute, or any other suitable interval. In other embodiments, the sensors 140 may provide the feedback upon activation of the controller 130 after the wait timer reaches the threshold time.

As indicated in block 208, the controller determines whether a feedback indicative of temperature is outside a parameter threshold or has a threshold correlation to other feedbacks indicative of other temperatures. The feedback indicative of temperature may be a determined value in degrees Fahrenheit or Celsius of a refrigerant fluid of the HVAC system 100. The parameter threshold may be a temperature threshold when comparing corresponding temperatures to one another or a pressure threshold when comparing corresponding pressures to one another. In the present embodiment, the parameter threshold is set as a boundary range defined around an average value of the feedback indicative of temperature from each temperature sensor within a shared or common environment. For example, in the outdoor HVAC unit 58, the parameter threshold may be set as a boundary range from 5 percent below to 5 percent above a real-time average temperature determined from the temperature sensors 140 in the outdoor HVAC unit 58. However, any other suitable range, such as 1 percent, 3 percent, 10 percent, and so forth above and below the real-time average or a static, predefined average of the feedback may be used according to the techniques disclosed herein. It is to be understood that any suitable comparison between multiple values is contemplated by the present techniques. For example, the controller 130 may determine whether the feedback indicative of temperature has a threshold correlation to another feedback or average determined from multiple feedbacks. The threshold correlation may be a value-to-value comparison, a value-to-range comparison, a threshold percentage difference, and so forth. Moreover, because the present embodiment of the indoor HVAC unit 56 includes a single indoor temperature sensor 142, the controller 130 does not perform block 208 for the indoor unit. However, in certain embodiments having multiple temperature sensors within an indoor HVAC unit, the sensor management system 102 may additionally compare the feedback indicative of temperature from each indoor temperature sensor to each other.

In response to determining that a feedback indicative of temperature is outside the parameter threshold, the controller 130 proceeds to transmit an indication, as indicated in block 210. That is, because the controller 130 assumes the refrigerant has reached steady state, the controller 130 expects sensors 140 having a healthy status, or no errors, to provide feedback indicative of temperature within the parameter threshold from one another. As such, sensors that produce feedback outside of the parameter threshold are identified within the indication as having a potentially unhealthy status or as having an error. The indication may include various data related to the sensors 140 having potentially unhealthy statuses, such as sensor location, sensor name, sensor installation date, a degree to which the sensor reading was outside of the parameter threshold, and so forth. The controller 130 may therefore transmit the indication to a user device, a display screen, an indication device of the controller 130, or any other suitable component to notify a user of the sensor 140 having the potentially unhealthy status. In some embodiments, the indication transmitted to the indication device is a signal that instructs the indication device to activate a lighting element of the indication device, thus enabling a user to quickly and visually determine that the indication is present. Further, under conditions in which a majority of sensors produces feedback within the parameter threshold and a minority of sensors produces feedback outside of the parameter threshold, the indication transmitted by the controller 130 may identify each sensor of the minority of sensors. In some embodiments, after transmitting an indication of a potentially unhealthy sensor, the controller 130 enables the HVAC system 100 to enter subsequent ON-cycles, but does not receive, or receives and disregards, feedback from the potentially unhealthy sensors. Thus, the sensor management system 102 enables efficient identification of potentially unhealthy sensors and adapts operation of the HVAC system 100 accordingly.

In response to determining that a feedback indicative of temperature is not outside the parameter threshold, the controller 130 of the present embodiments proceeds to convert each feedback indicative of pressure to respective saturated temperatures, as indicated in block 212. For example, the controller 130 converts the feedback indicative of pressure from the outdoor pressure sensors 148, 152 of the outdoor HVAC unit 58 into corresponding saturated temperatures using a pressure-temperature diagram, for example. Additionally, the controller 130 converts the feedback indicative of pressure from the indoor pressure sensor 144 to corresponding saturated temperatures. As such, the sensor management system 102 enables the feedback from each sensor of the HVAC system 100 to be modified into a common parameter for performing comparisons therebetween.

As indicated in block 214, the controller 130 therefore proceeds to determine whether a saturated temperature is outside the parameter threshold. That is, the controller 130 of the present embodiment compares the saturated temperatures corresponding with the feedback received from outdoor pressure sensors 140 to the parameter threshold set around the average temperature value from the outdoor temperature sensors. Further, the controller 130 compares the saturated temperature corresponding to the indoor pressure sensor 144 to the parameter threshold around the indoor temperature sensor 142. In response to determining that a saturated temperature is outside of the parameter threshold, the controller 130 proceeds to transmit the indication, as indicated in block 210 discussed above. Alternatively, in response to determining that a saturated temperature is not outside the parameter threshold, the controller 130 enables operation of the HVAC system 100 and determines that the sensors 140 are each functioning properly.

As recognized herein, the embodied sensor management system 102 enables readings from each sensor 140 to be verified without a demand for external sensing devices. In general, an odd number of sensors may be utilized to facilitate the sensor management system 102 to self-identify ties between groups of sensors 140, each producing different values. However, as discussed above with reference to the indoor HVAC unit 56, two sensors of different types may be used to verify readings from one another. In certain embodiments in which an even number of sensors 140 is included, certain tie-breaking factors, such as sensor age, sensor placement, and so forth may be weighted to enable the HVAC system 100 to identify the sensor more likely to have the potentially unhealthy status. For example, if the sensors produce feedback that is outside the parameter threshold from one another, the controller 130 may determine that an older sensor closer to a moving component of the HVAC unit is more likely to be the unhealthy sensor and therefore operate the HVAC system 100 based on feedback from other sensors. In some embodiments having an even number of sensors, each providing feedback outside the parameter threshold from one another, the controller 130 may transmit an indication of the even mismatch, such that a service technician is brought in to identify any unhealthy sensors with the assistance of the indication from the controller 130.

Figure 7:
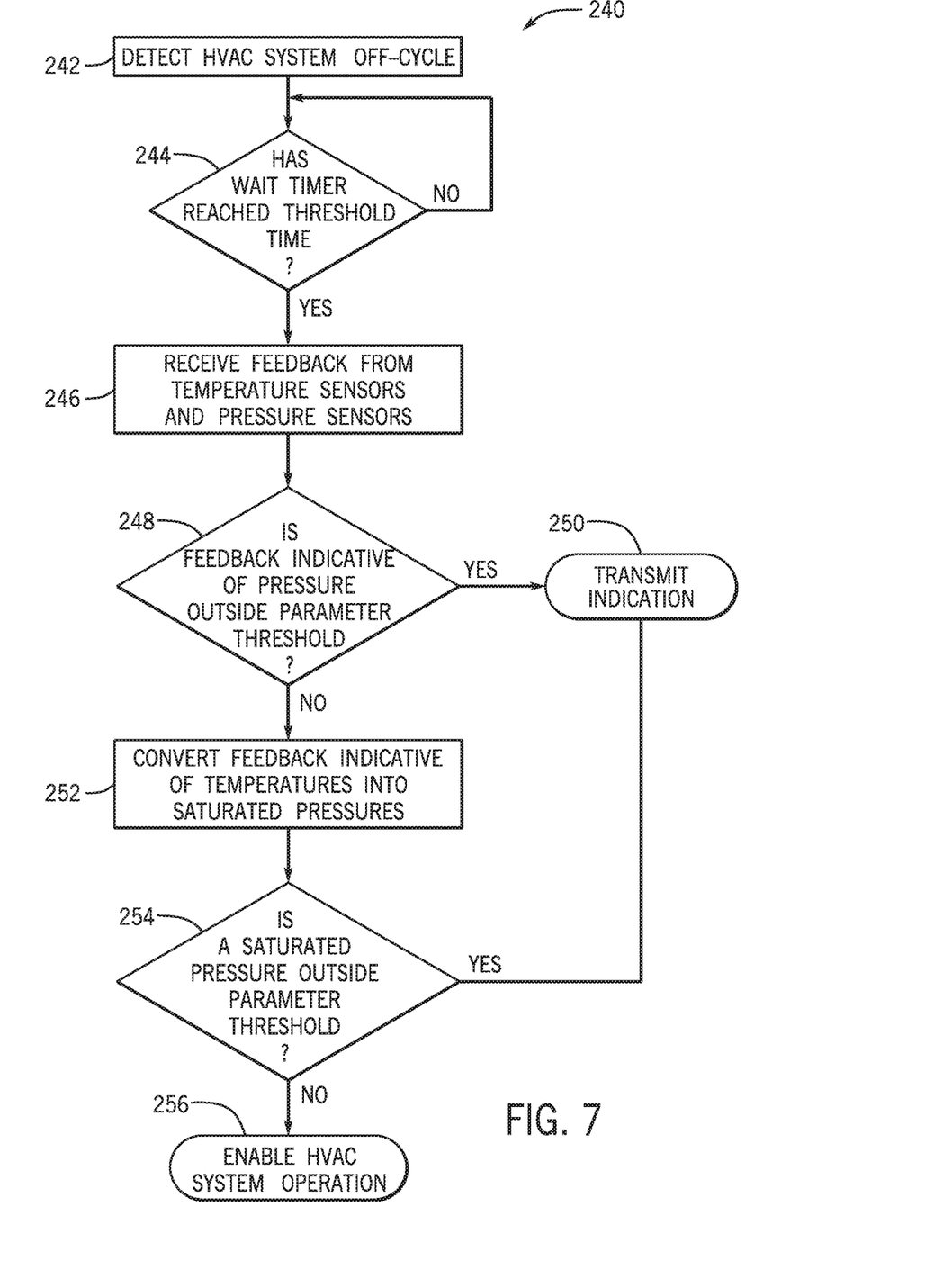
FIG. 7 is a flow diagram of an embodiment of a method for operating the sensor management system of FIG. 5, in accordance with an aspect of the present disclosure.

FIG. 7 is a flow diagram of an embodiment of a process 240 performed by the sensor management system 102 for monitoring a status of the sensors 140 of the HVAC system 100. It is to be understood that the steps discussed herein are merely exemplary, and certain steps may be omitted or performed in a different order than the order discussed herein. The process 240 includes multiple blocks that generally correspond to the blocks of process 200 of FIG. 6. However, as discussed below, the process 240 illustrates that the comparison between feedback from the sensors 140 of the HVAC system 100 can be performed with reference to pressures and saturated pressures instead of temperatures and saturated temperatures. In some embodiments, the process 240 may be employed to more rapidly identify statuses of sensors in HVAC systems having more pressure sensors than temperature sensors.

Indeed, blocks 242, 244, 246, 250, and 256 of FIG. 7 generally correspond to blocks 202, 204, 206, 210, and 216 of FIG. 6. Looking now to certain distinctions of process 240 from process 200, as indicated in block 248, the controller 130 determines whether feedback indicative of pressure is outside a respective parameter threshold. The parameter threshold may be defined for each enclosure or environment of the HVAC system 100 and may be set as a threshold range around an average reading of each feedback indicative of pressure within each unit, as generally discussed above with reference to block 218 of FIG. 6. Indeed, for the outdoor HVAC unit 58, the controller 130 receives feedback indicative of pressure from the pressure sensors 148, 152, determines an average pressure, and determines whether any of the feedback is outside the pressure parameter threshold from the average pressure. In response to determining that a feedback indicative of pressure is outside the parameter threshold, the controller 130 transmits the indication identifying the pressure sensor, as indicated in block 250, and as discussed above with reference to block 210 of FIG. 6.

Alternatively, in response to determining that a feedback indicative of pressure is not outside the parameter threshold, the controller 130 proceeds to convert each feedback indicative of temperature from the temperature sensors 140 to saturated pressures, as indicated in block 252. Then, the controller 130 determines, as indicated in block 254, whether a saturated pressure is outside the respective parameter threshold for pressure. For example, and with reference to the outdoor HVAC unit 58, the controller 130 determines saturated pressures corresponding with each outdoor temperature sensor 146, 150, 154, 156, 158, compares each saturated pressure to the parameter threshold, and identifies any sensors 140 producing values outside of the parameter threshold. Further, the controller 130 compares the saturated pressure determined from feedback received from the indoor temperature sensor 142 to the feedback indicative of pressure from the indoor pressure sensor 144. As such, operations of two sensors may be verified by the sensor management system 102. In response to determining that a temperature sensor is producing feedback that generates a saturated pressure outside the parameter threshold, the controller 130 transmits the indication, as indicated in block 250. In response to determining that a saturated pressure is not outside the parameter threshold, the controller 130 proceeds to enable operation of the HVAC system 100, as indicated in block 256, and as discussed above with reference to block 216 of FIG. 6.

Figure 8:
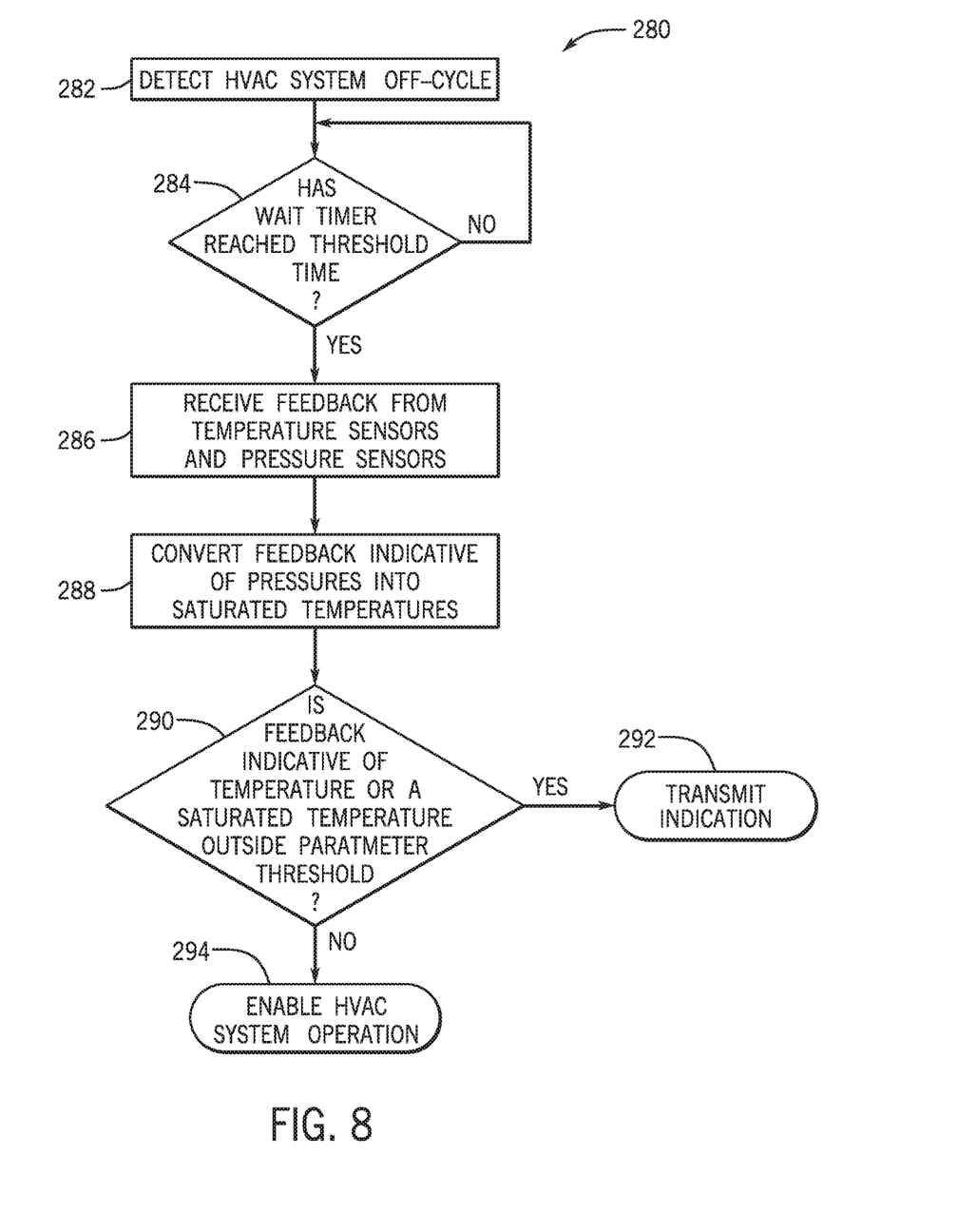
FIG. 8 is a flow diagram of an embodiment of a method for operating the sensor management system of FIG. 5, in accordance with an aspect of the present disclosure.

FIG. 8 is a flow diagram of an embodiment of a process 280 performed by the sensor management system 102 for monitoring a status of the sensors 140 of the HVAC system 100. It is to be understood that the steps discussed herein are merely exemplary, and certain steps may be omitted or performed in a different order than the order discussed herein. The process 280 includes multiple blocks that generally correspond to the blocks of process 200 of FIG. 6. However, as discussed below, the process 280 illustrates that the comparison between feedback from the sensors 140 of the HVAC system 100 can be performed once with reference to a common parameter, instead of first with reference to a first parameter and second with reference to a second parameter. As such, the process 280 may be more efficient for certain embodiments of the HVAC system 100, such as those with a smaller quantity of sensors. While discussed with reference to temperatures, it is to be understood that the single-step comparison may also be performed with reference to pressures or other suitable operating parameters as well.

Indeed, blocks 282, 284, 292, and 294 of FIG. 8 generally correspond to blocks 202, 204, 210, and 216 of FIG. 6. Looking now to certain distinctions of process 280, as indicated in block 286, the controller 130 receives feedback from each sensor 140 of the HVAC system 100. Then, as indicated in bock 248, the controller proceeds to convert feedback indicative of pressure to saturated temperatures, without first comparing each feedback indicative of temperature to one another and/or a parameter threshold.

The controller 130 performing the process 280 next determines whether a feedback indicative of temperature or a determining saturated temperature is outside a respective parameter threshold, as indicated in block 290. The parameter threshold may be defined for each enclosure or environment of the HVAC system 100 and may be set as a threshold range around an average reading of the feedback indicative of temperature and the saturated temperatures within each unit, as generally discussed above with reference to block 218 of FIG. 6.

In response to determining that a feedback indicative of temperature or a saturated temperature is outside the parameter threshold, the controller 130 transmits the indication identifying the corresponding sensor 140, as indicated in block 292, and as discussed above with reference to block 210 of FIG. 6. In response to determining that a feedback indicative of temperature and a saturated temperature is not outside the parameter threshold, the controller 130 performing the process 280 proceeds to enable operation of the HVAC system 100, as indicated in block 294, and as discussed above with reference to block 216 of FIG. 6.

Figure 9:
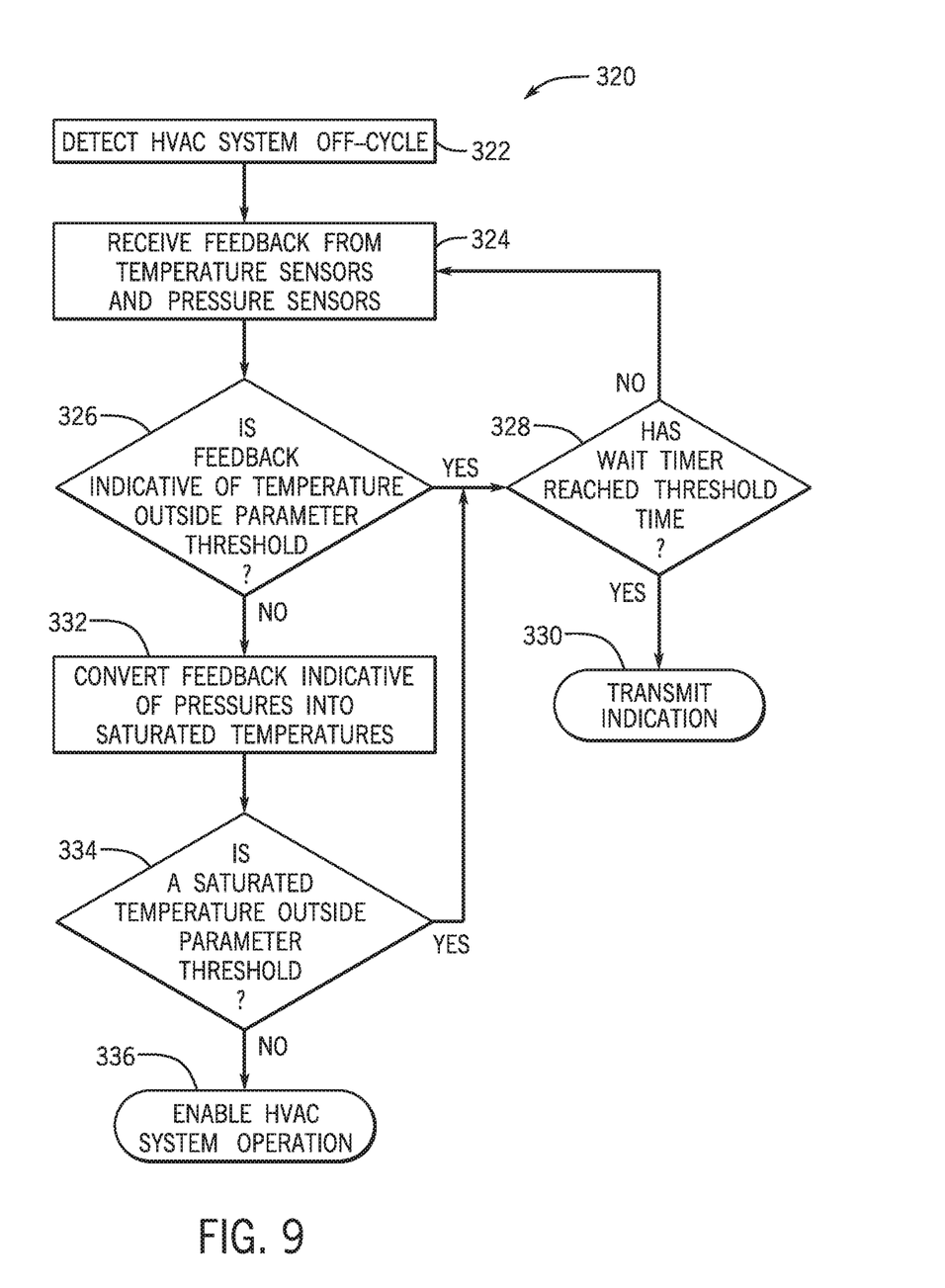
FIG. 9 is a flow diagram of an embodiment of a method for operating the sensor management system of FIG. 5, in accordance with an aspect of the present disclosure.

FIG. 9 is a flow diagram of an embodiment of a process 320 performed by the sensor management system 102 for monitoring a status of the sensors 140 of the HVAC system 100. It is to be understood that the steps discussed herein are merely exemplary, and certain steps may be omitted or performed in a different order than the order discussed herein. The process 320 includes multiple blocks that generally correspond to the blocks of process 200 of FIG. 6. However, as discussed below, the process 320 illustrates that the controller 130 can determine that the HVAC system 100 has reached steady state and/or can determine that sensors 140 have a potentially unhealthy status based on comparison of feedback from the sensors 140 of the HVAC system 100. As such, the process 320 may be more adaptable for embodiments in more variable environments, such as those that experience large temperature swings during the course of a day or week. While discussed with reference to feedback indicative of temperature and saturated temperatures, it is to be understood that in other embodiments, the process 320 may be performed with reference to feedback indicative of pressure and saturated pressures instead.

Indeed, certain blocks of FIG. 9 generally correspond to certain blocks of FIG. 6, but performed in a different order. For example, the controller 130 detects an OFF-cycle of the HVAC system 100, as indicated in block 322, and as discussed above with reference to block 202 of FIG. 6. Then, the controller 130 proceeds to receive feedback from the sensors 140, as indicated in block 324, and as discussed above with reference to block 206 of FIG. 6. That is, after detecting the OFF-cycle, the controller 130 begins receiving feedback from the sensors 140 without waiting for a delay to elapse. As indicated in block 326, and as discussed above with reference to block 208 of FIG. 6, the controller 130 determines whether a feedback indicative of temperature that is outside the parameter threshold.

Then, in response to determining that a feedback indicative of temperature is not within the parameter threshold, the controller 130 proceeds to determine whether the wait timer has reached a threshold time, as indicated in block 328, and as discussed above with reference to block 204 of FIG. 6. In response to determining that the wait timer has not reached the threshold time, the controller 130 returns to block 324 to continue receiving feedback from the sensors 140 in block 324. In response to determining that the wait timer has reached the threshold time, the controller 130 proceeds to transmit an indication, as indicated in block 330, and as described in block 210 of FIG. 6. As such, the controller 130 may adaptively wait for a threshold time to be reached based on received feedback.

In response to determining at block 326 that a feedback indicative of temperature is outside the parameter threshold, the controller proceeds to convert feedback indicative of pressure into saturated temperatures, as indicated in block 322, and as discussed above with reference to block 212 of FIG. 6. Then, the controller 130 determines whether a saturated temperature is outside the parameter threshold, as indicated in block 334, and as discussed above with reference to block 214 of FIG. 6. In response to a saturated temperature being outside of the parameter threshold, the controller 130 continues to block 328 as discussed above. In response to a saturated temperature not being outside the parameter threshold, the controller 130 enables operation of the HVAC system 100, as indicated in block 336, and as discussed above with reference to block 216 of FIG. 6.

Accordingly, the present disclosure is directed to a sensor management system capable of internally verifying operation of sensors throughout an HVAC system. A controller of the sensor management system can determine whether refrigerant of the HVAC system has reached a steady state condition. When at the steady state condition, the refrigerant becomes a two-phase, saturated fluid that enables temperatures to be converted to saturated pressures and enables pressures to be converted to saturated temperatures. As such, the controller compares feedback from one type of sensor to feedback from another type of sensor with by converting some of the feedback, such that the controller compares the same parameter for each sensor. Thus, the sensor management system enables identification of sensors that are producing feedback outside an expected range. Based on the determination of a sensor producing feedback outside the expected range, the sensor management system can transmit indications and modify operation of the HVAC system to enable efficient and cost-effective monitoring for each temperature and pressure sensor of the HVAC system.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A sensor management system for a heating, ventilation, and air conditioning (HVAC) system, comprising:
   a first sensor configured to provide feedback indicative of a temperature of a working fluid of the HVAC system;
   a second sensor configured to provide feedback indicative of a pressure of the working fluid; and
   a controller communicatively coupled to the first sensor and the second sensor, wherein the controller is configured to:
      receive the feedback indicative of the pressure from the second sensor and convert the feedback indicative of the pressure into a value indicative of a saturated temperature associated with the working fluid; and transmit an indication in response to determining that the value indicative of the saturated temperature has a threshold correlation to the feedback indicative of the temperature received from the first sensor.

2. The sensor management system of claim 1, wherein the controller is further configured to:

convert the feedback indicative of the temperature into a value indicative of a saturated pressure associated with the working fluid; and transmit another indication in response to determining that the value indicative of the saturated pressure has a threshold correlation to the feedback indicative of the pressure.

3. The sensor management system of claim 2, wherein the threshold correlation to the feedback indicative of the temperature and the threshold correlation to the feedback indicative of the pressure are different from one another.

4. The sensor management system of claim 1, wherein the feedback indicative of the temperature comprises a first feedback indicative of the temperature, and further comprising a third sensor configured to provide a second feedback indicative of an additional temperature of the HVAC system to the controller.

5. The sensor management system of claim 4, wherein the controller is configured to determine an additional threshold correlation to the feedback indicative of the temperature based on the first feedback indicative of the temperature and the second feedback indicative of the additional temperature.

6. The sensor management system of claim 4, wherein the controller is configured to transmit another indication in response to determining that the value indicative of the saturated temperature has the threshold correlation to the first feedback indicative of the temperature, the second feedback indicative of the additional temperature, and the value indicative of the saturated temperature.

7. The sensor management system of claim 4, wherein the working fluid comprises a refrigerant, wherein the temperature of the HVAC system comprises a refrigerant temperature of the refrigerant, and wherein the additional temperature of the HVAC system comprises an ambient temperature.

8. The sensor management system of claim 1, wherein the working fluid comprises a refrigerant, and wherein the pressure of the HVAC system comprises a refrigerant pressure of the refrigerant.

9. The sensor management system of claim 1, wherein the controller is configured to determine that the HVAC system is in an OFF-cycle before converting the feedback indicative of the pressure into the value indicative of the saturated temperature.

10. The sensor management system of claim 9, wherein the controller is further configured to wait a predetermined time after determining that the HVAC system is in the OFF-cycle before converting the feedback indicative of the pressure into the value indicative of the saturated temperature.

11. The sensor management system of claim 9, wherein the controller is further configured to:

determine that a value of the feedback indicative of the pressure is at least substantially constant for a defined time before converting the feedback indicative of the pressure into the value indicative of the saturated temperature;

determine that a value of the feedback indicative of the temperature is at least substantially constant for the defined time before converting the feedback indicative of the pressure into the value indicative of the saturated temperature; or determine that the value of the feedback indicative of the pressure and the value of the feedback indicative of the temperature are at least substantially constant for the defined time before converting the feedback indicative of the pressure into the value indicative of the saturated temperature.

12. The sensor management system of claim 11, wherein the controller is configured to:

determine that the value of the feedback indicative of the pressure is at least substantially constant for the defined time by receiving an additional value of the feedback indicative of the pressure that is substantially equal to the value of the feedback indicative of the pressure;

determine that the value of the feedback indicative of the temperature is at least substantially constant for the defined time by receiving an additional value of the feedback indicative of the temperature that is substantially equal to the value of the feedback indicative of the temperature; or determine that the value of the feedback indicative of the pressure is at least substantially constant for the defined time by receiving the additional value of the feedback indicative of the pressure that is substantially equal to the value of the feedback indicative of the pressure and determine that the value of the feedback indicative of the temperature is at least substantially constant for the defined time by receiving the additional value of the feedback indicative of the temperature that is substantially equal to the value of the feedback indicative of the temperature.

13. The sensor management system of claim 1, wherein the value indicative of the saturated temperature has the threshold correlation to the feedback indicative of the temperature when the value indicative of the saturated temperature is outside a value range or a percentage difference range defined around the feedback indicative of the temperature.

14. The sensor management system of claim 1, wherein the feedback indicative of the temperature of the HVAC system comprises a determined value in degrees Fahrenheit or degrees Celsius of a refrigerant fluid of the HVAC system.

15. A controller for a heating, ventilation, and air conditioning (HVAC) system, wherein the controller is configured to:

receive a first feedback from a first sensor of the HVAC system;

receive a second feedback from a second sensor of the HVAC system;

determine a saturated parameter corresponding to a working fluid based on the second feedback; and transmit an indication in response to determining that the saturated parameter has a threshold correlation to the first feedback.

16. The controller of claim 15, wherein the first feedback comprises a feedback indicative of a temperature of the HVAC system, the second feedback comprises a feedback indicative of a pressure of the HVAC system, and the saturated parameter comprises a value indicative of a saturated temperature corresponding to the feedback indicative of the pressure.

17. The controller of claim 15, wherein the first feedback comprises a feedback indicative of a pressure of the HVAC system, the second feedback comprises a feedback indicative of a temperature of the HVAC system, and the saturated parameter comprises a value indicative of a saturated pressure corresponding to the feedback indicative of the temperature.

18. The controller of claim 17, wherein the controller is configured to determine the value indicative of the saturated parameter based on the second feedback via a database including a pressure-temperature relationship of the working fluid.

19. The controller of claim 15, wherein, after determining that the HVAC system is in an OFF-cycle, the controller is configured to:
wait a threshold time before receiving the first feedback;
wait the threshold time before receiving the second feedback; or
wait the threshold time before receiving the first feedback and the second feedback.

20. The controller of claim 15, wherein, after determining that the HVAC system is in an OFF-cycle, the controller is configured to wait a threshold time before determining the saturated parameter based on the second feedback.

21. The controller of claim 15, wherein the controller is configured to:
receive a third feedback from a third sensor of the HVAC system; and
transmit the indication in response to determining that the third feedback has a threshold correlation to the first feedback and the saturated parameter.

22. The controller of claim 15, wherein the saturated parameter comprises a first saturated parameter, wherein the controller is configured to:
receive a third feedback from a third sensor of the HVAC system;
determine a second saturated parameter corresponding to the working fluid based on the third feedback; and
transmit the indication in response to determining that the second saturated parameter has a threshold correlation to the first feedback and the first saturated parameter.

23. The controller of claim 22, wherein the third feedback comprises a feedback indicative of an additional temperature of the HVAC system and the second saturated parameter comprises a value indicative of a saturated pressure corresponding to the feedback indicative of the additional temperature.

24. A tangible, non-transitory, computer-readable medium, comprising instructions executable by at least one processor of a sensor management system for a heating, ventilation, and air conditioning (HVAC) system that, when executed by the at least one processor, cause the at least one processor to:
receive feedback indicative of a pressure from a first sensor of the HVAC system;
receive feedback indicative of a temperature from a second sensor of the HVAC system;
convert the feedback indicative of the temperature into a value indicative of a saturated pressure corresponding to a working fluid; and
transmit an indication in response to determining that the value indicative of the saturated pressure is outside a threshold range from the feedback indicative of the pressure.

25. The computer-readable medium of claim 24, wherein the feedback indicative of the pressure comprises a value indicative of the pressure.

26. The computer-readable medium of claim 24, wherein the instructions, when executed by the at least one processor, cause the at least one processor to:
detect that the HVAC system is in an OFF-cycle; and
wait a defined time after detecting that the HVAC system is in the OFF-cycle before converting the feedback indicative of the temperature into the value indicative of the saturated pressure.

27. The computer-readable medium of claim 26, wherein the instructions, when executed by the at least one processor, cause the at least one processor to:
dynamically adjust the defined time based on a current season or current ambient temperature of the HVAC system.

28. The computer-readable medium of claim 24, wherein the instructions, when executed by the at least one processor, cause the at least one processor to:
convert the feedback indicative of the pressure into a value indicative of a saturated temperature corresponding to the working fluid; and
transmit the indication in response to determining that the value indicative of the saturated temperature is outside another threshold range from the feedback indicative of the temperature.

29. The computer-readable medium of claim 24, wherein the instructions, when executed by the at least one processor, cause the at least one processor to:
modify an operation of the HVAC system based on the indication, wherein modifying the operation comprises blocking the HVAC system from entering an ON-cycle.

30. The computer-readable medium of claim 24, wherein the instructions, when executed by the at least one processor, cause the at least one processor to:
modify an operation of the HVAC system based on the indication, wherein modifying the operation comprises blocking the HVAC system from determining operational decisions based on feedback from an identified sensor identified by the indication.

* * * * *